March 2, 1954

A. J. GRANBERG 2,670,756

IMPACT RESPONSIVE FLOW REGULATOR VALVE

Filed Dec. 22, 1947

INVENTOR.
ALBERT J. GRANBERG
BY
Bruce & Brosler
HIS ATTORNEYS

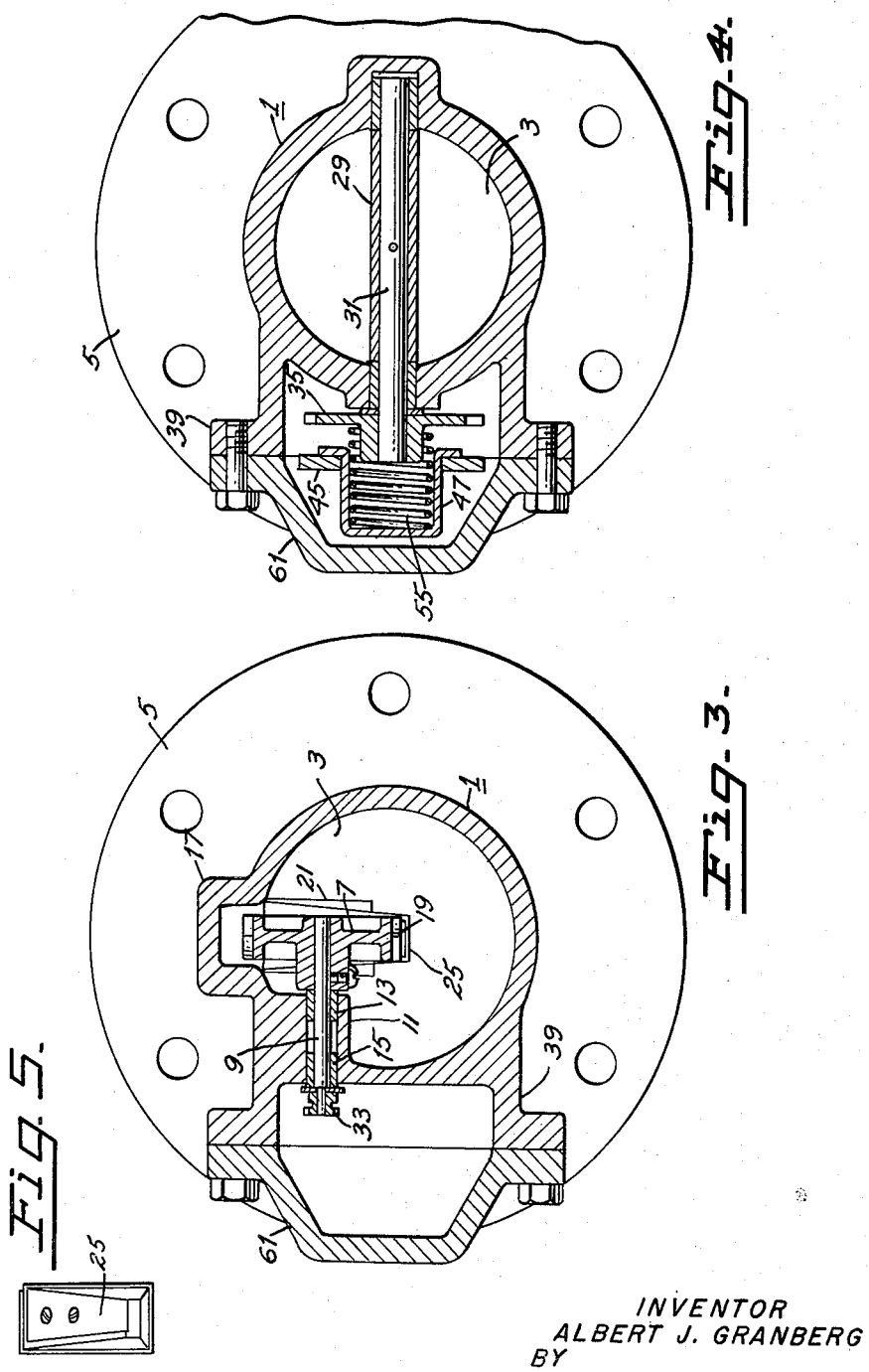

Patented Mar. 2, 1954

2,670,756

UNITED STATES PATENT OFFICE 2,670,756

IMPACT RESPONSIVE FLOW REGULATOR VALVE

Albert J. Granberg, Oakland, Calif.

Application December 22, 1947, Serial No. 793,283

1 Claim. (Cl. 137—499)

My invention relates to valves in general and more particularly to a flow regulator valve for controlling maximum volume of flow of fluid through a line.

The invention is particularly applicable in conjunction with meters designed to accurately measure flow within a predetermined range, to assure that the flow through such meter shall not exceed the maximum which the meter is guaranteed to measure accurately.

Among the objects of my invention are:

(1) To provide a novel and improved flow regulator valve;

(2) To provide a novel and improved flow regulator valve capable of imposing a limit on the maximum permissible flow of a fluid through a given line;

(3) To provide a novel and improved flow regulator valve which is adjustable as to the desired maximum permissible flow of fluid through a line;

(4) To provide a novel and improved flow regulator valve which is responsive to any increase in flow above a desired predetermined maximum, but non-responsive to flow of fluid below such maximum value.

Additional objects of my invention will be brought out in the following description of a preferred embodiment of my invention taken in conjunction with the accompanying drawings wherein—

Figure 3 is a view in section taken in the plane 3—3 of Figure 2;

Figure 4 is a view in section taken in the plane 4—4 of Figure 2.

Figure 5 is a view depicting a construction of a nozzle incorporated in the device of the preceding figures.

Figure 1:
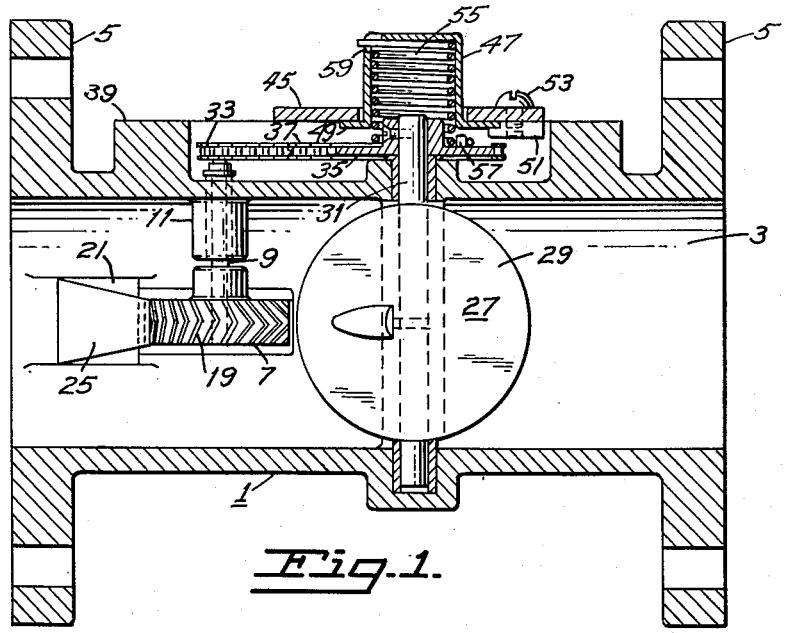
Figure 1 is a view in section through the flow regulator valve of the present invention taken in the plane 1—1 of Figure 2.
Figure 2:
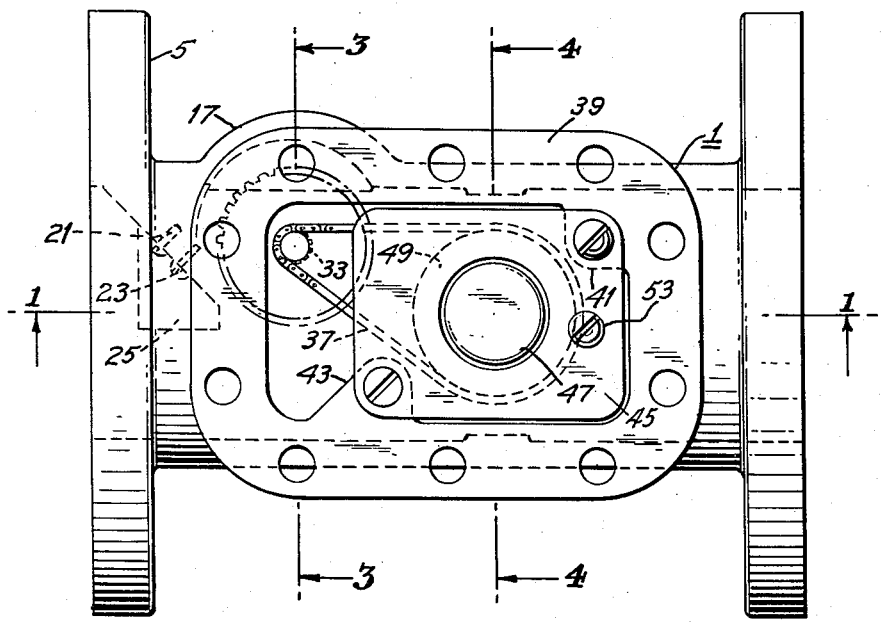
Figure 2 is a side elevational view of the valve of Figure 1.

Referring to the drawings for details of my invention in its preferred form, the same comprises a housing 1 in the form of a pipe section having a longitudinal cylindrical passage 3 therethrough, such housing terminating at each end in a circular flange 5 for coupling the same into a pipe line.

Disposed in the passage adjacent the entrance to the housing, is a turbine wheel 7. This wheel is preferably mounted on a shaft 9 passing through the wall of the housing and a boss 11 on the inner side thereof, and journalled in suitable bearings 13, 15 fitted therein. The location of this shaft is such as to support the turbine wheel in substantially the upper half of the passage, the upper wall portion of the housing at this point being formed in an arch 17 to facilitate such disposition of the turbine wheel.

The turbine wheel itself may be of any suitable type, though preferably of the type illustrated, in which the wheel is provided about its periphery with a plurality of "chevron" teeth or blades 19.

Except for the lowermost portion of its periphery, the wheel is protected against capacity flow of fluid through the housing, by a depending boss 21 at the entrance to the passage. In other words, when the maximum amount of liquid is flowing through the valve passage, the turbine wheel is protected against the full impact thereof by the presence of this boss. Such boss is preferably formed with a downwardly sloping planar surface 23, to which is affixed, means in the form of a nozzle 25 for directing fluid substantially tangentially and at increased velocity, against the exposed blades of the turbine wheel.

At an intermediate location in the passage is a valve, preferably in the form of a butterfly valve 27 involving a disc 29 diametrically affixed to a shaft 31 which is journalled at opposite points in the cylindrical inner wall of the housing. One end of this valve shaft extends through the wall of the housing, in position to be coupled to the turbine shaft 9 by a drive connection.

Such drive connection preferably takes the form of a small sprocket 33 on the turbine shaft connected to a larger sprocket 35 on the valve shaft by a drive chain 37 encircling both sprockets, whereby angular movement of the turbine wheel will cause a corresponding though smaller angular movement of the valve.

The aforementioned drive connection is encircled by a cover mounting rib 39 extending laterally from the wall of the housing. This rib is formed with a pair of inwardly extending flanges 41 and 43 to provide a foundation for the mounting of a plate 45 having a circular opening therethrough in alignment with the valve shaft sprocket. A cylindrical coil spring housing 47 having a flange 49 at its open end, extends through the opening in the plate 45 with its flange in abutment against the under surface of the plate and clamped thereto by a nut 51 on a clamping screw 53 passing downwardly through the plate.

A coil spring 55 within this housing has its inward end anchored about a stud 57 on the valve shaft sprocket, while its other end is anchored in a slot opening 59 formed in the spring housing. This spring holds the valve in its open position against any suitable stop. By loosening up on the clamping screw 53, the housing is free to be manually rotated, and in this manner, the tension of the spring, tending to hold the valve in its open position, may be regulated, following which, a retightening of the clamping screw, will hold such adjustment. Thus, the amount of force necessary to rotate the valve toward its closing position may be changed to satisfy desired conditions.

A cover 61 matching in contour the cover mounting rib 39, is bolted to the rib by suitable bolts and serves to protect the drive connection and spring adjustment from injury and unauthorized tampering.

In its operation, any rotation of the turbine wheel will necessarily impart corresponding angular movement of the butterfly valve from its normally full open position. Such rotation of the turbine wheel is made responsive to flow of fluid through the passage in which it is disposed. However, inasmuch as the turbine wheel is disposed in the upper portion of the passage, such fluid flow will not begin to exert any force against the wheel until the flow is such that the level thereof rises above the lower edge of the nozzle. Under these circumstances, that portion which enters the nozzle will be directed against the blades on the exposed lower portion of the periphery of the turbine wheel. Inasmuch as the spring means 55 offers resistance to rotation of the turbine wheel, rotation of the turbine wheel cannot take place until the flow impact against the wheel builds up to a value where it not only balances the resistance offered by the spring means but exceeds such resistive force, whereupon the resulting rotation of the turbine wheel will bring about a movement of the valve toward closing position.

However, as the valve rotates toward its closed position, partial restriction of the passage necessarily follows, which in turn reduces the flow impact against the turbine wheel, thereby slowing its rotational movement to a halt when a condition of equilibrium has been established.

Such condition of equilibrium results when the partial closing of the valve reduces the flow to a point where the flow impact against the turbine wheel no longer exceeds the resistance to rotation offered by the spring means. The partially closed position of the valve will, of course, vary under the circumstances, with the magnitude of the supply of fluid to the housing.

It thereby becomes apparent, that when the fluid passing through the housing is to pass through a meter for measuring, the maximum flow to the meter may be controlled so as not to exceed that value representing the upper maximum which the meter is guaranteed to measure accurately.

Thus while I have disclosed my invention in its preferred form and in considerable detail, the same is subject to alteration and modification without departing from the underlying principles thereof, and I, accordingly, do not desire to be limited in my protection to such details, except as may be necessitated by the appended claim.

I claim:

A flow regulator valve comprising a housing in the form of a pipe section having a substantially longitudinal cylindrical passage therethrough, a turbine wheel in the upper portion of said passage adjacent the entrance thereto and having a shaft extending through the wall of said housing, means including a nozzle for directing liquid, entering said passage, against the periphery of said turbine wheel substantially tangential thereto, a butterfly valve mounted diametrically of said passage and including a shaft extending through the wall of said housing, spring means normally biasing said butterfly valve to open position, and a drive connection between said turbine wheel and said butterfly valve for closing said butterfly valve to a degree depending on the impact developed against said wheel by the inflowing liquid, said drive connection including a sprocket on said extended turbine wheel shaft, a sprocket on said extended butterfly valve shaft and a chain encircling said two sprockets.

ALBERT J. GRANBERG.

References Cited in the file of this patent

UNITED STATES PATENTS

| Number | Name | Date |
|---|---|---|
| 757,039 | Herreshoff | Apr. 12, 1904 |
| 1,096,962 | Stoffel | May 19, 1914 |
| 1,237,203 | Guill et al. | Aug. 14, 1917 |
| 1,311,202 | Anderson | July 29, 1919 |
| 1,616,778 | Booth | Feb. 8, 1927 |
| 1,778,450 | De Florez | Oct. 14, 1930 |

FOREIGN PATENTS

| Number | Country | Date |
|---|---|---|
| 485,303 | France | of 1917 |